UNITED STATES PATENT OFFICE.

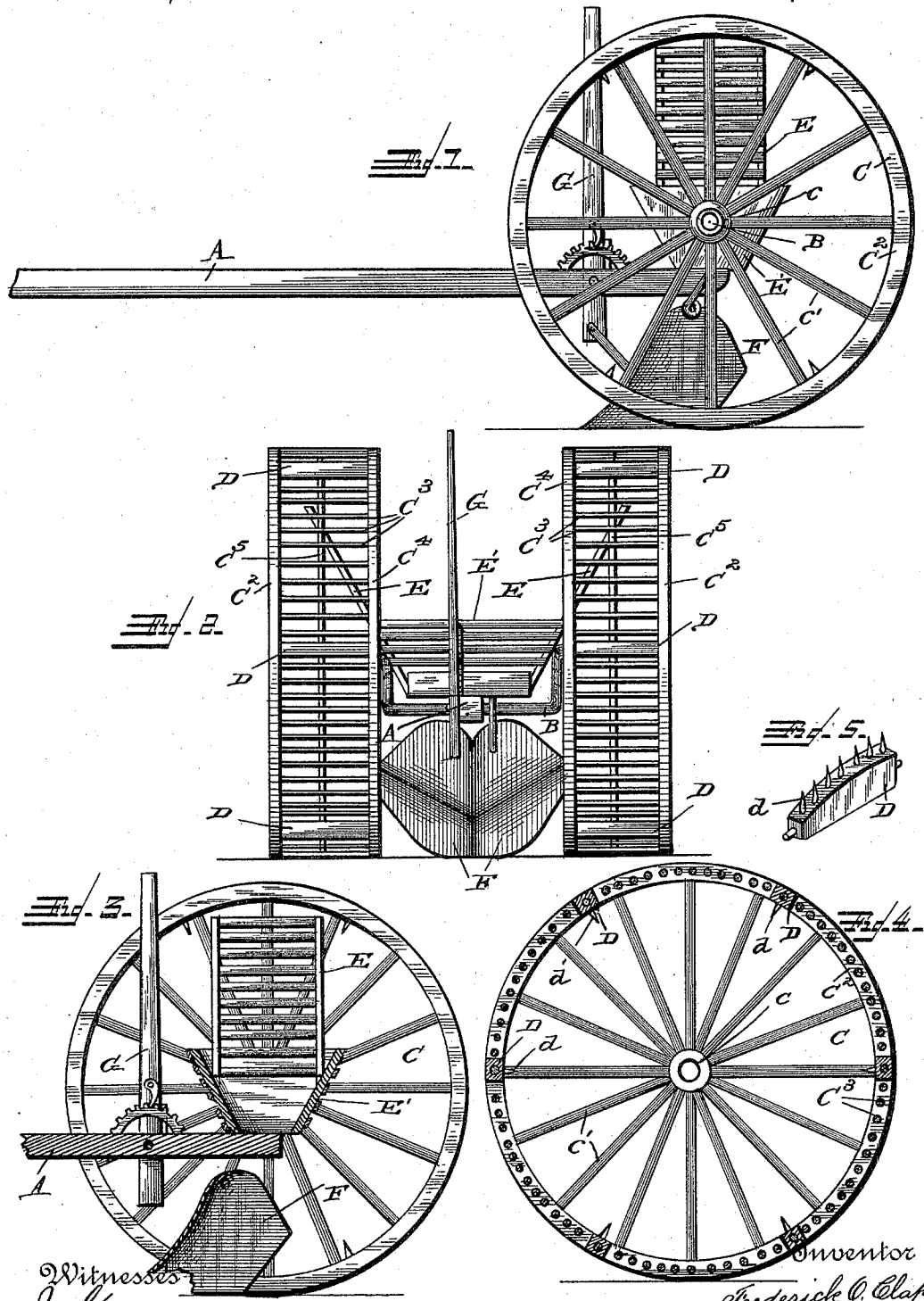

FREDERICK O. CLAPP, OF CUBA, NEW YORK.

POTATO-DIGGER.

SPECIFICATION forming part of Letters Patent No. 579,131, dated March 23, 1897.

Application filed January 14, 1896. Serial No. 575,452. (No model.)

*To all whom it may concern:*

Be it known that I, FREDERICK O. CLAPP, a citizen of the United States, residing at Cuba, in the county of Allegany and State of New York, have invented certain new and useful Improvements in Potato-Diggers; and I do hereby declare the following to be a full, clear, and exact description of the invention, such as will enable others skilled in the art to which it appertains to make and use the same.

This invention relates to certain new and useful improvements in potato-diggers; and it has for its object, among others, to provide an improved machine of this class by means of which the potatoes may be dug, carried to a revolving wheel or wheels, the dirt and all refuse separated from the potatoes, and the latter carried by suitable means into a sack or other receptacle placed in position to receive the same or deposited in piles upon the ground as the machine moves along. The wheels are formed with broad treads, which are provided with slats or other open-work to permit of the ready discharge of the dirt therethrough, so that the earth and stones and other refuse may fall out and be separated from the potatoes, while on the inside of the wheel are provided buckets or elevators which receive the potatoes as they are delivered into the wheels from the plow and which carry the potatoes up to the top of the wheels, where they are dropped onto an apron which carries them into the center of the machine, into a hopper or a carrier, from which they run out onto the ground or into crates, as may be desired.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of my improved potato-digger. Fig. 2 is a rear elevation. Fig. 3 is a longitudinal section through the same. Fig. 4 is a central section through one of the drive-wheels, and Fig. 5 is a perspective detail of one of the pockets or elevators thereof removed.

Like letters of reference indicate like parts in the several views.

Referring now to the details of the drawings by letter, A designates the pole or tongue, and B the axle. C are the drive-wheels, which consist of a suitable hub $c$, from which radiate the spokes $c'$, connected to and supporting the outer rim $C^2$, from which extend the lateral slats, rods, or analogous devices $C^3$, supported at their other ends in the inner rim $C^4$, the rods or slats being arranged at the proper distance apart and braced near their centers by the band or ring $C^5$. It will thus be observed that the inner end of the wheel is open. Upon the inner periphery of this wheel are the buckets or elevators D, arranged at suitable distances apart and provided with the fingers $d$, which buckets or elevators and fingers are adapted to receive the potatoes as they are delivered into the wheel and to carry them around in the rotation of the wheel until they reach the top of said wheel, where they are dropped into an apron E, which is fixedly supported from the axle and which inclines toward the center of the machine and is designed to receive the potatoes as they fall from the elevator, and down whose inclined side the potatoes fall into a hopper $E'$, supported at the center of the machine, and from which the potatoes are discharged either into the sacks, which may be supported beneath the said hopper, or they may be allowed to drop from the hopper onto the ground between the wheels. There are two of these wheels, one upon each end of the axle, with their open ends adjacent to each other, but as they are alike in construction and operation a description of the one will suffice for both.

The potatoes are designed to be dug or removed from the earth by the centrally-disposed plows F, supported beneath the beam in any suitable manner and double-winged, so as to throw the potatoes and earth upon opposite sides of the central line of the machine, from whence they may fall into the wheels and are carried up, as heretofore described, the earth and stones and other refuse falling out through the open spaces in the broad treads of the wheels, so that when the potatoes reach the uppermost point they are entirely free from earth, stones, and other refuse.

G is a lever pivotally mounted, as shown, and connected by suitable means with the plow, so that the depth of the furrow dug thereby may be regulated, or the plow may be thrown entirely out of operation, if desired. The aprons which carry the potatoes from the wheels to the hopper, as well as the hopper bottom or platform, are also made of slats or open-work, so that any dirt or refuse which might possibly adhere to the potatoes or may leave the wheels will be removed in their passage over the apron and on the bottom of the hopper, which latter inclines backward, so that the potatoes will readily fall therefrom.

Modifications in detail may be resorted to without departing from the spirit of the invention or sacrificing any of its advantages.

Having thus described the invention, what is claimed as new is—

1. In a potato-digger, the combination with a centrally-disposed plow and the oppositely-disposed wheels having slotted peripheries and open on their adjacent ends, of the aprons relatively fixed and inclining toward each other to deposit their contents at the center of the machine, and a hopper arranged to receive the potatoes from both of said aprons, and having a slatted bottom, substantially as described.

2. The combination with the axle and the oppositely-disposed wheels having broad slatted treads and open on their adjacent ends, and the centrally-disposed plows adapted to throw the potatoes and earth into said wheels, of carriers on the inner periphery of said wheels, aprons relatively fixed and oppositely disposed and inclined toward the center and extended into said wheels and having slatted walls and a hopper disposed to receive the potatoes from said aprons and having its sides slatted and inclined, substantially as described.

In testimony whereof I have signed this specification in the presence of two subscribing witnesses.

FREDERICK O. CLAPP.

Witnesses:
  H. D. BLISS,
  F. B. SIBLEY.